Dec. 8, 1959  C. F. PABST ET AL  2,916,018
CONTROL MECHANISM
Filed July 1, 1955  2 Sheets-Sheet 1
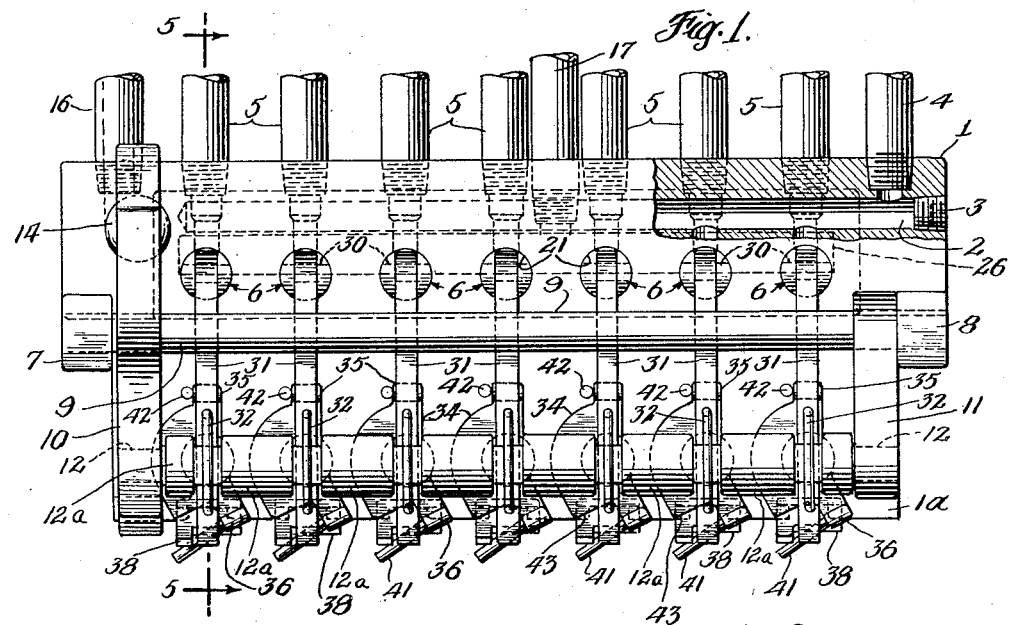
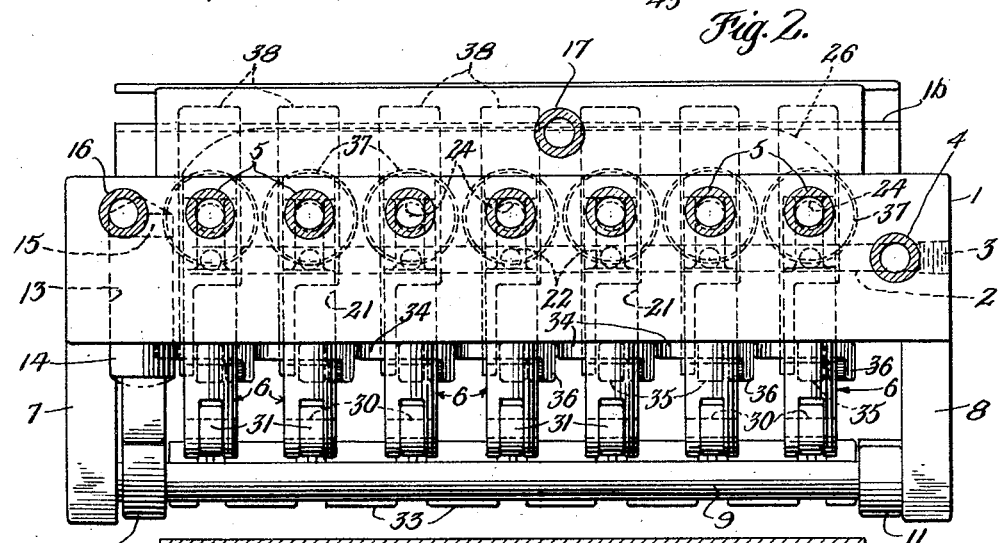
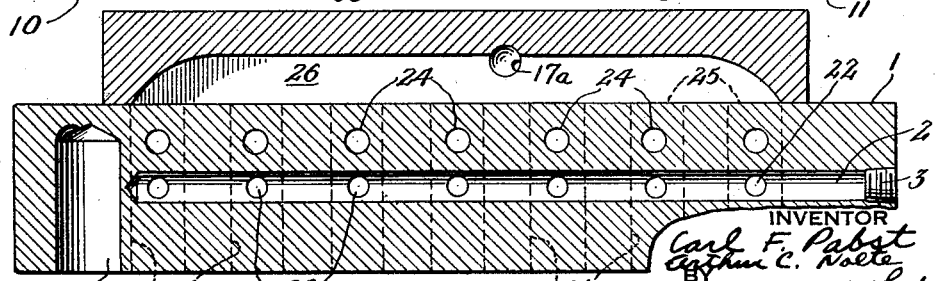
INVENTOR
Carl F. Pabst
Arthur C. Nolte
BY Synnestvedt & Lechner
ATTORNEYS

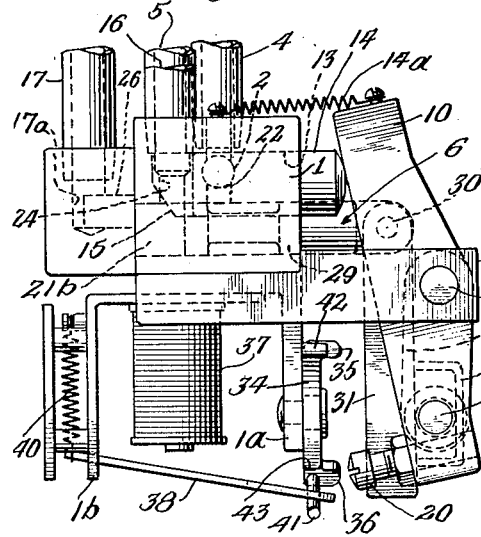
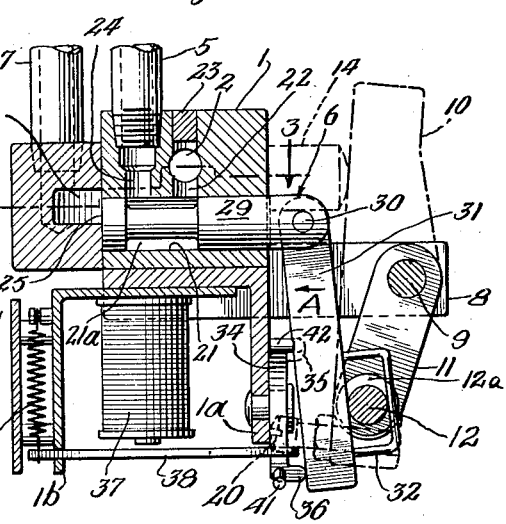
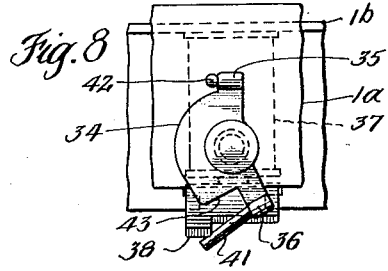
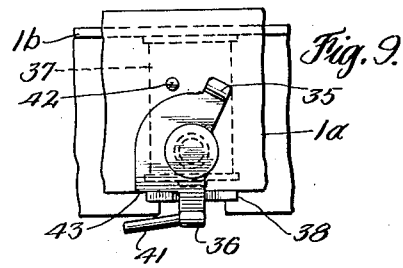
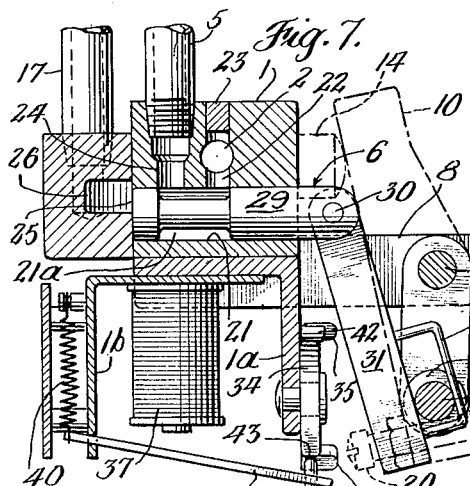
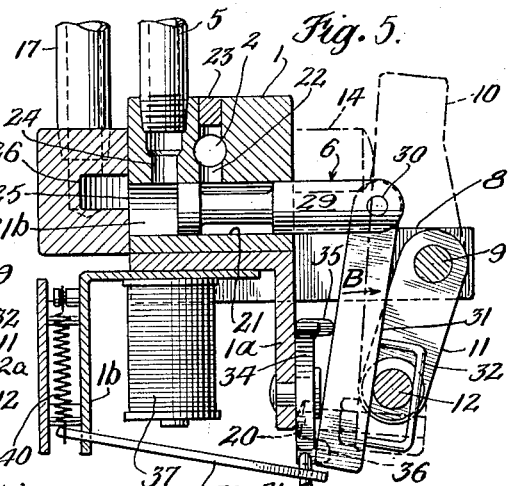
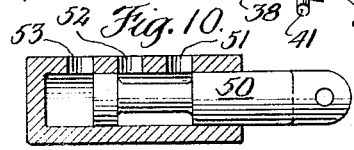
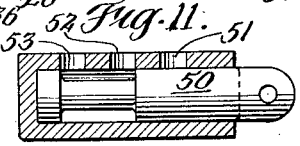

2,916,018

Patented Dec. 8, 1959

2,916,018
CONTROL MECHANISM

Carl F. Pabst, Cincinnati, and Arthur C. Nolte, Blue Ash, Ohio, assignors to The Lodge & Shipley Company, Cincinnati, Ohio, a corporation of Ohio Application July 1, 1955, Serial No. 519,434

12 Claims. (Cl. 121—46.5)

This invention relates in general to fluid control equipment and, in particular, to valves and apparatus for regulating the operation of such valves.

One of the objects of the invention is to provide for the controlling of fluid by valve means and contemplates a movable mechanism associated with the valve for the control thereof together with fulcrum means and force applying means which may selectively be positioned variably relative to each other so as to control the direction and/or extent of movement of the mechanism and thereby affect the operation of the valve. In the preferred embodiment of the invention, such relative variable positioning is effected by altering the position of the fulcrum means.

Another object of the invention is to provide for the control of fluid by a valve having two positions wherein it differently affects the controlled fluid and an actuator movable between two positions together with mechanism interconnected between the actuator and the valve controllable so that when the actuator is in either of its two positions, the valve is in one or the other of its positions.

Another object of the invention is to provide for the controlling of a plurality of valves by a plurality of motion transmitting mechanisms independently respectively connected with the valves, together with actuating means common to the mechanisms and controllable shiftable fulcrum means operatively arranged to control the movement of the motion transmitting mechanisms.

Another object of the invention is to provide a device having a plurality of valves for selectively transferring fluid, the device having a common actuating means for the valves together with mechanism which is selectively controllable so that when the actuating means is operated, a valve, if conducting, will continue to conduct or cease to conduct, or alternatively, a valve, if not conducting, will remain in that condition or begin to conduct.

Another object of the invention is to provide a device having a plurality of valves and a common actuating means for the valve spools, together with mechanism interposed between the actuating means and one end of each spool, the mechanisms being individually controllable to selectively affect spool motion when the actuating means is operated.

Another object of the invention is to provide in mechanism for regulating a valve, an operating arm whose direction of movement determines valve operation, together with shiftable fulcrum means controllable to determine the direction of movement of the arm.

Another object of the invention is to provide for the controlling of a valve by motion-transmitting mechanism connected to the valve spool, the direction of movement of the mechanism being determined by a controllable shiftable fulcrum.

The invention has special advantage and utility in those instances where a plurality of fluid operated devices are to be controlled, particularly where it is desired to cause certain combinations of the devices to function at different intervals, for example, in a preselect system for a lathe where it is desired to work different portions of an article at different rotational speeds and at different rates of tool feed. In such a system, our device provides for a control which can be operated to select some desired feed and speed and then, with the lathe working under the selected conditions, the control can be operated to select another condition of feed and speed so that the lathe, when finished working under the first selected conditions, can be automatically or manually changed to operate under the second selected conditions.

The present preferred manner in which the device of the invention is constructed, together with certain other objects, features and advantages will be apparent from the following description and drawings wherein:

Figure 1 is a front elevational view of the device partly in section looking toward the left in Figure 4;

Figure 2 is a plan view of Figure 1;

Figure 3 is a plan section of the valve body with certain portions removed, the section being taken substantially on the line 3—3 of Figure 6;

Figure 4 is an end elevational view looking toward the right in Figure 1 showing the actuating means in an operative position and the valve in non-transfer condition;

Figure 5 is a cross section taken on the line 5—5 of Figure 1 showing the actuating means in inoperative position and the valve in non-transfer condition;

Figure 6 is a cross sectional view similar to Figure 5 showing in particular the actuating mechanism in operative position and the valve in transfer condition;

Figure 7 is a cross section similar to Figure 5 showing the actuating mechanism in inoperative position and the valve in transfer condition;

Figure 8 is a face view of the fulcrum means as positioned in Figures 4, 5 and 7;

Figure 9 is a face view of the fulcrum means as positioned in Figure 6; and

Figures 10 and 11 show two positions of a modified form of valve.

The embodiment of the invention as seen in Figure 1 has a main body 1 provided with an elongated bore 2 having a fluid sealing cap 3 and connected with a fluid line 4. The line 4 may be connected to a source of fluid pressure such as the discharge side of a pump. The fluid in the bore 2 can be transferred to any of a plurality of receiver lines 5—5 or the fluid flowing to the lines may be cut off by the operation of valves generally indicated by 6—6. The lines 5—5 may be interconnected to devices to be operated by transfer of fluid thereto. The valves have a common actuating means and interposed between each valve and the actuating means are mechanisms which respectively control the valves to effect the transfer of fluid. The actuating means will next be described.

On opposite ends of the body 1 are fixedly secured two posts 7 and 8 carrying a shaft 9 rotatably journaled therein. Fixedly mounted on the shaft 9 are the bars or arms 10 and 11 respectively disposed adjacent the posts. A shaft 12 is connected to and extends between the two arms 10 and 11. The mounting of the shaft 9 provides for the assembly comprising the shaft 12 and arms 10 and 11 to be moved or rotated as a unit with respect to the posts 7 and 8 (in and out of the plane of the paper as viewed in Figure 1). This is preferably accomplished by fluid pressure mechanism explained following.

As seen in Figures 2 and 4, the body 1 has a bore 13 which forms a cylinder within which is mounted a piston 14. The cylinder is arranged so that a chamber 15 is formed behind the piston, and this is in communication with the line 16. Preferably the line 16 is connected to a source of fluid pressure through valve means or the like which, when actuated, will cause a build-up of the unit pressure in chamber 15 and tend to move the piston 14 out of the cylinder and then decrease so that the piston can move back to the position of Figure 2. This latter movement is effected by a spring 14a (see Figure 4) which is interconnected between the arm 10 and the body 1. The pressure causing outward movement of the piston 14 will be called "shift pressure" herein.

The position of the piston 14 in Figure 2 corresponds to that of Figure 4 wherein there is no shift pressure behind the piston and it will be seen that the arm 10, being pulled by spring 14a, has pushed the piston in. Thus, without shift pressure, the action of spring 14a positions the piston 14, the arms 10 and 11 and shaft 9 as shown. This is the inoperative position of the actuating means. When the shift pressure is on, the piston 14 moves outwardly so that the arms 10 and 11 and the shaft 9 are caused to swing about the axis of shaft 9 and assume the position as shown in Figure 6. This is the operative position of the actuating means. An adjustable screw 20 is provided on one end of the arm 10 and contacts the bracket 1a on the body 1 to serve as a stop to fix the desired operative position of the actuating means.

The body 1 is provided with a plurality of bores 21 (see Figure 3) which form cylinders for the several valves 6. These cylinders are interconnected, each by a port 22, with the bore 2. A plurality of plugs such as indicated at 23 in Figure 6 seals off the ports. Another group of ports 24 in the body 1 interconnects the respective cylinders with the several receiver lines 5. Another group of ports 25 (as best seen in Figure 6) in the body 1 interconnects the respective cylinders with a chamber 26 (also see Figure 3), which is connected by a port 17a with the drain line 17. The drain line may be connected, for example, to a sump or to the intake side of a pump.

Thus, the cylinders 21 have inlets 22 connected to a source of fluid such as the discharge side of a pump, outlets 24 connectible with receiver lines for supplying fluid to devices to be actuated thereby and outlets 25 adapted to be connected to the intake side of a pump.

All of the valves 6 and the mechanisms operatively interposed between the valves and the actuating means are preferably identical in form, and the construction and operation of these will therefore be described essentially with reference to one of them, as illustrated in Figures 4 to 9.

Within each of the cylinders 21 is a movable member or spool, one of which is indicated by 29 in Figures 4 to 7. As seen in the above referred to figures, each spool is formed so that when in the position as shown in Figures 6 and 7, fluid can pass from the inlet 22 through the portion 21a of the cylinder through the outlet 24 to the receiver line 5. When the spool is in the position shown in Figures 4 and 5, the fluid from inlet 22 to the outlet 24 of receiver line 5 is stopped and the fluid from receiver line 5 can drain off through outlet 24, the portion 21b of the cylinder, outlet 25, chamber 26 and port 17a to the line 17.

Thus, it will be apparent that by controlling the position of the various spools, any one or any group of valves may be arranged so as to transfer fluid or not transfer fluid. The mechanism which will be described below provides for the valves to be individually controlled so that any one or any combination of valves, upon operation of the actuating means, will shift from a transfer condition to a non-transfer condition (or vice versa) or will not be shifted, hence, remain in the same condition as prior to the operation of the actuating means.

As best seen in Figures 4 to 7, each valve spool 29 is interconnected by a pivot such as 30 to an arm or operating mechanism 31. Each arm carries a guide 32 disposed over the shaft 12 and maintains the arm and shaft in engagement. As seen in Figure 1, a plurality of spacers 12a mounted on the shaft 12 maintains the arms in the desired position, i.e., to prevent from moving left to right.

From the foregoing, it will be apparent that if the actuating means is moved or rotated, a motion will be imparted to the arms 31. By selectively controlling the direction of motion of the arms 31, the movement of the corresponding spools 29 is controlled. The mechanism for selecting the direction of movement will next be described.

As seen in Figure 1, there is associated with each of the arms 31 a member 34. Each such member is pivotally mounted upon the bracket 1a on the body 1. Each of the members has a pair of upstanding heads or abutments 35 and 36 which, as will be explained later, serve as fulcrums. In the position shown in Figure 1, each fulcrum 35 is directly in alignment with an arm 31, i.e., if the arm is moved toward the plane of the paper, contact will be made with the fulcrum 35. As best seen in Figures 4 to 6, the body 1 has a bracket 1b which mounts a plurality of solenoids, one of which is indicated at 37. The solenoid armature 38 is pivotally connected with the bracket 1b and is biased by a spring 40 so that when the solenoid is de-energized, the armature assumes the position as shown in Figure 4. When the solenoid is energized, the armature 38 assumes the position as shown in Figure 6.

As best seen in Figure 8, the member 34 has an abutment 41 which is adapted to be engaged by the armature 38 when the solenoid is in the de-energized condition. The effect of this engagement is to move or rotate the member 34 so that the fulcrum 35 is against the stop 42 and thus is in alignment with the arm 31. When the solenoid is energized, the armature 38 assumes the position as shown in Figure 6 and in moving to this position, engages the abutment surface 43 on the member 34 which causes the member to shift or rotate clockwise so that the fulcrum 35 is moved out of alignment and the fulcrum 36 is moved into alignment with arm 31. When the solenoid is again deenergized, the movement of the armature 38 will strike the abutment 41 and thus cause the fulcrum to shift or rotate counterclockwise and again assume the position as shown in Figure 8. The manner in which the shiftable fulcrums are used to control the direction of movement of the valves will next be explained.

Referring to Figure 4, it will be noted that the actuating means is in the inoperative position, the solenoid 37 is de-energized so that the fulcrum 35 is in alignment with the arm 31 and that the spool 29 is in non-transfer position. If the shift pressure is operated to move the actuating means into operative position, the shaft 12, being in engagement with arm 31, will cause the arm to rotate clockwise about the pivot 30 until such time as it engages the fulcrum 35 (see Figure 5). At this time the stop 20 engages the bracket 1a and further clockwise motion of the arm 31 is prevented. The fulcrum 35 and the stop 20 are arranged so that the arm contacts the fulcrum and the stop contacts the bracket substantially simultaneously. When the shift pressure is removed, the actuating means returns to inoperative position as in Figure 4, the guide 32 on shaft 12 causing the arm 31 to move about the pivot 30. Thus, the spool remains in non-transfer condition even though the actuating means has been operated.

With the spool and the actuating means in the position of Figure 4, energizing of the solenoid will cause the fulcrum 36 to be shifted into alignment with the arm 31. If the shift pressure is then operated to move the actuating means into operative position, the arm 31 will rotate clockwise about the pivot 30 until contact is made with the fulcrum 36 (see Figure 6) and at this time, the arm will pivot or tilt or rotate counter-clockwise (in the direction shown by the arrow A) about the fulcrum 36 and cause the spool 29 to be shifted to the left or into transfer position. The stop 20 and the fulcrum 36 are arranged so that the motion about the fulcrum 36 is stopped when the spool has reached transfer position. When the shift pressure is removed, the actuating means returns to inoperative position and the arm 31 will rotate counterclockwise about the pivot 30 so that the spool position is not disturbed (see Figure 7).

Assuming that the solenoid remains energized and that the shift pressure is again actuated, the actuating means will be moved to operative position (Figure 6) but the spool position will not be affected because the arm 31 will merely rotate clockwise about the pivot 30 until contact is made with the fulcrum 36 and the stop 20 contacts the bracket 1a. When the shift pressure is relieved, the actuating means and arm will return to the position of Figure 7. Thus, the valve spool remains in transfer condition even though the actuating means has been operated.

Again referring to Figure 7, if the solenoid is deenergized so that the fulcrum 35 is in alignment with the arm 31, operation of the shift pressure will cause the actuating means to move to operative position and the arm 31 will be rotated about the pivot 30 until contact is made with the fulcrum 35. This will cause the arm to rotate or pivot about the fulcrum 35 in the clockwise direction as shown by the arrow B (Figure 5) and this motion will continue until the stop 20 contacts the bracket 1a. The effect of the foregoing movement of the arm is to shift the spool 29 into non-transfer condition. When the shift pressure is relieved, the arm and the actuating means assume the position of Figure 4. The fluid in the receiver lines can drain to sump, as has been explained heretofore.

From the above, it will be apparent that when the actuating mechanism is in its inoperative or "A" position, the valve spool 29 can be in either of two positions, i.e., as in this case in transfer or non-transfer condition. Also, it will be noted that when the actuating mechanism is in its operative or "B" position, the spool can be in either of its two mentioned positions. Thus, the interconnection between the piston 14 and the spool 29 provides for an operative interconnection under four different conditions, the particular condition being effected by the relative disposition of the movable fulcrum means.

From the foregoing description, it will be noted that the actuating means applies a force (when moving to operating position) to the arm 31 at a point located as between the fulcrums 35 and 36 and that the direction of movement of the arm is controlled as by the shifting of the fulcrum with respect to the point of force application. Also, it will be observed that the point at which the force is applied to the arm changes somewhat for different positions of the valve; for example, compare Figures 4 and 7 where it will be noted that the distance between the pivot 30 and the point of contact of the arm 31 and shaft 12 (as taken along the axis of the arm 31) is greater in Figure 7 than in Figure 4. Further, it will be observed by a comparison of Figures 4 and 6 that the point at which force is applied shifts somewhat along the arm when the valve is moved from non-transfer to transfer condition. Also compare Figures 7 and 5 when the valve is shifted from transfer to non-transfer condition. In connection with the foregoing, it will be noted that the guide 32 is elongated to accommodate the relative sliding movement between the arm 31 and shaft 12.

The valve arranged as described above may be modified so that the function of the valve as respects position is reversed. For example, as seen in Figure 10, the outward position of the spool 50 effects transfer of fluid from inlet 51 to outlet 52 connected to a receiver line. The inner position of the spool in Figure 11 cuts off the flow of fluid from inlet 51 to outlet 52, the outlet 52 being connected to the drain outlet 53.

As pointed out heretofore, the invention herein finds special usefulness for controlling a plurality of fluid operated devices, particularly where certain combinations of the device are to be functionally operative at different intervals. However, it will be understood that the invention is adapted for the desired control of a single valve. Furthermore, it will be apparent that the invention is readily adaptable in those instances where a single valve (or a plurality) is used in combination with an electrical or mechanical device which is coupled to the valve actuating means so that its operation is effected by the movement thereof.

We claim:

1. Fluid control equipment comprising: a valve including a fixed body portion having at least two fluid ports and a body adapted to be moved in opposite directions whereby to selectively interconnect said fluid ports; an actuator having a unidirectional movement for use in moving said movable body in opposite directions; mechanism interconnected as between one side of said movable body and said actuator and operated by the actuator for moving said movable body in said two directions; and means associated with said mechanism operative to condition the mechanism to move said body in one or the other of said opposite directions in response to the unidirectional movement of said actuator.

2. Fluid control equipment comprising: a valve including a fixed body having fluid ports and a body adapted to be movable whereby to selectively interconnect said fluid ports; an operating arm pivotally mounted on said movable body and adapted to have a first condition wherein the arm is pivoted with respect to the movable body and a second condition wherein the arm pivots about a point spaced from said movable body, the arm in said second condition being operative to move said body; means associated with said arm and alternatively operable to select one or the other conditions of operation; and mechanism to cause pivoting of said arm under either of said conditions.

3. Fluid control equipment comprising: a valve including a fixed body having fluid ports and a body adapted to be moved whereby to selectively interconnect said fluid ports; an operating arm pivotally mounted on said movable body and adapted to move the same; means for applying a unidirectional actuating force at a predetermined position on said arm whereby to move the same; and abutment means shiftable along the length of said arm with respect to said predetermined position whereby to cause said arm to move in a preselected direction when said actuating force is applied.

4. Fluid control mechanism comprising: a valve including a fixed body having at least two fluid ports and a body movable in opposite directions adapted to selectively interconnect said ports; an elongated arm pivotally connected to said movable body and adapted to be tilted in a plane, the tilting motion causing said movement of said movable body; a pair of interconnected fulcrums mounted adjacent one side of said arm; means to selectively move one or the other of said fulcrums into said plane; and mechanism to apply a unidirectional force to said arm for causing engagement with one or the other of said fulcrums whereby to cause said tilting motion, the point of force application being interjacent said fulcrums.

5. A construction in accordance with claim 4 wherein said means includes a solenoid, the armature of which is engageable with said fulcrums.

6. Fluid control mechanism comprising: an elongated body having a plurality of valves, each valve including a chamber, at least three fluid ports open to the chamber, and a spool movable in the chamber for alternatively interconnecting the first of said ports with the second or third of said ports; a fluid passage making a common connection to the second fluid port in each of the valves, the passage being adapted to be connected to the discharge side of a pump; a second fluid passage making a common connection to the third fluid port in each of said valves, the passage being adapted to be connected to the inlet side of the pump; a plurality of arms each respectively pivotally connected to said spool and adapted to be tilted in a plane; an actuating cylinder in said body and an actuating piston slidable therein, the cylinder being adapted for connection to a source of fluid pressure; a bar pivotally connected to said body; a spring yieldably holding said bar and said piston in engagement whereby movement of the piston causes movement of the bar; a shaft extending from said bar and interconnected with each of first said arms for moving the same in unison; a plurality of pairs of interconnected fulcrums, each pair mounted on said body respectively adjacent one side of said arms; and a plurality of solenoids, the armatures of which are respectively engageable with said fulcrums, each solenoid, when energized, being adapted to move one of its corresponding pivots into the plane of the corresponding arm, and, when de-energized, to move the other pivot into the plane.

7. Fluid control equipment comprising: a valve member movable between first and second positions wherein it differently affects the controlled fluid; an actuator movable between an A position and a B position; a shifting mechanism operatively interconnecting said actuator and said valve member under four different conditions, the first condition being characterized by the A positioning of said actuator and the first positioning of said valve member, the second by the B positioning of said actuator and the first positioning of said valve member, the third by the A positioning of said actuator and the second positioning of said member, and the fourth by the B positioning of said actuator and the second positioning of said member; and a selector including movable fulcrum means associatable with said shifting mechanism and adapted to provide alternative fulcrum points for an element of said mechanism, whereby the positioning of the valve member in its first position and its second position will respectively obtain when the actuator is in its A position and its B position, respectively, and alternatively the positioning of said valve member in its second position and its first position will respectively obtain with the A positioning and the B positioning respectively, of said actuator, depending upon which of said alternative fulcrum points is made effective for said element by operation of said selector.

8. Fluid control equipment comprising: a valve member movable to affect the control of fluid; a movable operating arm pivotally connected with said member for movement in a plane, the movement of the arm being adapted to control the direction of movement of the member; and mechanism to control the movement of said arm including fulcrum means and force applying means both associated with said arm respectively on opposite sides thereof, the force applying means cooperating with the fulcrum means to move the arm about the fulcrum means and one of said means being adapted to assume different relative positions with respect to said pivotal interconnection to control the direction of movement of said arm.

9. Fluid control equipment comprising: a valve having a movable member for controlling the flow of fluid; a turnable operating mechanism pivotally connected with said member and adapted to be turned alternatively to a first or a second position, the turnable operating mechanism in both of said positions conditioning the member for controlling the flow of fluid; an actuator having a unidirectional movement for engaging said turnable operating mechanism to cause turning of the same to either of said positions; and a selector including shiftable fulcrum means associated with said turnable operating mechanism and adapted to be shifted alternatively to one or the other of two different positions with respect to the turnable operating mechanism whereby the turnable operating mechanism, in response to the operation of said actuator, engages the fulcrum means and is turned to said first or second position.

10. Fluid control equipment comprising: a valve having a movable member for controlling the flow of fluid; a turnable operating mechanism pivotally connected with said member and adapted to be turned alternatively to a first or a second position, the turnable operating mechanism in both of said positions conditioning the member for controlling the flow of fluid; an actuator having a unidirectional movement for engaging said turnable operating mechanism to cause turning of the same to either of said positions; and a selector including shiftable fulcrum means associated with said turnable operating mechanism and adapted to be shifted alternatively to one or the other of two different positions with respect to the turnable operating mechanism whereby the turnable operating mechanism, in response to the operation of said actuator, engages the fulcrum means and remains in or is turned to said first or said second position.

11. In fluid control equipment having a plurality of valves for selectively controlling fluid flow, mechanism to operate said valves independently of one another including: a plurality of turnable operating mechanisms respectively pivotally connected with each valve and each adapted to be turned alternatively to a first or a second position, each operating mechanism in both of said positions conditioning the associated valve for controlling the flow of fluid; an actuator having a unidirectional movement for engaging said turnable operating mechanisms to cause turning of the same to either of said positions; and a plurality of selectively controllable members each including shiftable fulcrum means associated respectively with said turnable operating mechanisms and adapted to be shifted alternatively to one or the other of two different positions with respect to the turnable operating mechanism whereby the turnable operating mechanism, in response to the operation of said actuator, engages the fulcrum means and remains in or is turned to said first or second position.

12. Fluid control equipment comprising: a plurality of valves each having a movable member for controlling the flow of fluid; a plurality of turnable operating mechanisms respectively pivotally connected with said members and each adapted to be turned alternatively to a first or a second position, each operating mechanism in both of said positions conditioning the associated movable member for controlling the flow of fluid; an actuator commonly engaged with said turnable operating mechanisms and having an unidirectional movement for turning the same to either of said positions; a plurality of selectors each including shiftable fulcrum means associated respectively with said turnable operating mechanisms and adapted to be shifted alternatively to one or the other of two different positions with respect to the turnable operating mechanism whereby the turnable operating mechanism, in response to the operation of said actuator, engages the fulcrum means and remains in or is turned to said first or second position.

References Cited in the file of this patent

UNITED STATES PATENTS

| 2,708,093 | Leber | May 10, 1955 |
| 2,852,948 | Renick | Sept. 23, 1958 |

FOREIGN PATENTS

| 651,818 | Great Britain | Apr. 11, 1951 |